No. 770,005. PATENTED SEPT. 13, 1904.
M. E. HADDEN.
HEATER FOR SAD IRONS.
APPLICATION FILED AUG. 29, 1903.
NO MODEL.
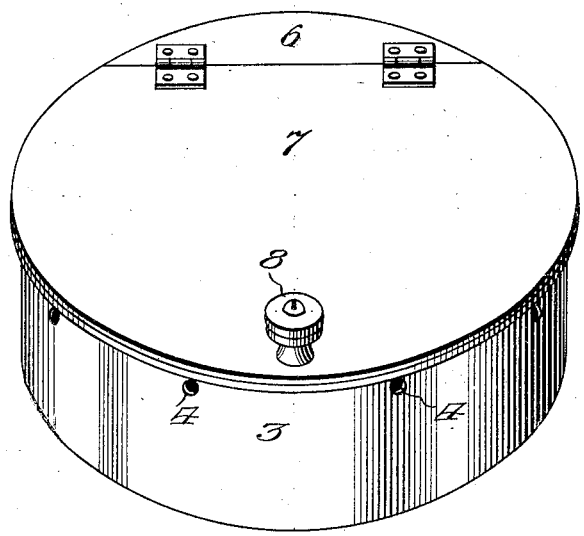
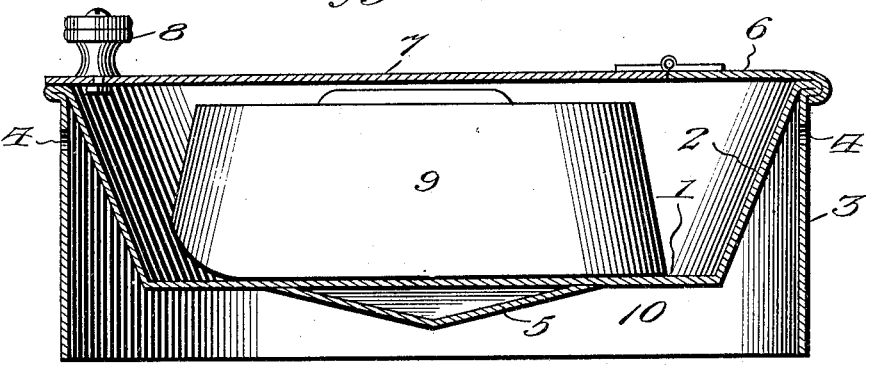
Witnesses
Edwin G. McKee
Hubert D. Lawson
Inventor
Maurice E. Hadden
By Victor J. Evans
Attorney No. 770,005.  Patented September 13, 1904.

UNITED STATES PATENT OFFICE.

MAURICE E. HADDEN, OF SAVANNAH, NEW YORK.

HEATER FOR SAD-IRONS.

SPECIFICATION forming part of Letters Patent No. 770,005, dated September 13, 1904.

Application filed August 29, 1903. Serial No. 171,291. (No model.)

*To all whom it may concern:*

Be it known that I, MAURICE E. HADDEN, a citizen of the United States, residing at Savannah, in the county of Wayne and State of New York, have invented new and useful Improvements in Heaters for Sad-Irons, of which the following is a specification.

My invention relates to new and useful improvements in heaters for sad-irons; and its object is to provide a simple and inexpensive device in which a sad-iron may be readily placed and which is provided with means whereby the hot gases may be equally distributed over the faces of the heater, so as to thoroughly heat the iron contained therein.

With the above and other objects in view the invention consists in the novel construction, combination, and arrangement of parts, which will be hereinafter more fully described and claimed, and illustrated in the accompanying drawings, in which—

Figure 1 is a perspective view of the heater; and Fig. 2 is a longitudinal section therethrough, showing a sad-iron in position therein.

Referring to the figures by numerals of reference, 1 is the bottom of a receptacle having inclined sides 2, which are formed integral with a circular flange 3, extending downward below the bottom 1 and concentric therewith. Apertures 4 are formed in the flange 3 adjacent the upper edge thereof, and a conical extension 5 depends from the bottom 1, at the center thereof, so as to deflect hot gases toward the flange 3. A cross-strip 6 is secured in any suitable manner upon the flange 3, so as to extend over one side of the receptacle, and hinged to this cross-strip is a cover 7, having a suitable handle 8, whereby it may be readily raised or lowered.

In using the device the flange 3 is placed upon a stove or in any other suitable position over a fire, and the sad-iron 9 is then placed within the receptacle and the cover 7 moved into closed position. The products of combustion will pass upward into the compartment 10, formed between the flange 3 and the bottom 1 and sides 2 of the receptacle, and will be directed laterally by the extension 5, and will then flow outward through the apertures 4. As the hot gases are distributed over the entire surface of the receptacle, it will be understood that the sad-iron 9 will be quickly and thoroughly heated. The cover 7 prevents soot and other undesirable particles from contacting with the iron during the heating operation.

In the foregoing description I have shown the preferred form of my invention; but I do not limit myself thereto, as I am aware that modifications may be made therein without departing from the spirit or sacrificing the advantages thereof, and I therefore reserve the right to make such changes and alterations as may fall within the scope of my invention.

Having thus fully described my invention, what I claim as new, and desire to secure by Letters Patent, is—

In a sad-iron heater, the combination with a cylindrical casing open at the bottom and having apertures therein adjacent the top thereof; of a receptacle integral with and suspended within the casing, said receptacle having inclined sides, a depending conical extension from the bottom of the receptacle, a cross-strip upon the receptacle, and a closure hinged thereto and normally closing the receptacle.

In testimony whereof I affix my signature in presence of two witnesses.

MAURICE E. HADDEN.

Witnesses:
THEODORE C. WETHEY,
JOHN A. PECK.